(12) United States Patent
Padovano et al.

(10) Patent No.: US 8,903,766 B2
(45) Date of Patent: Dec. 2, 2014

(54) DATA MIRRORING USING A VIRTUAL CONNECTION

(75) Inventors: Michael Padovano, Englishtown, NJ (US); Michael G. Byrnes, Dunellen, NJ (US); Charles E. Christian, Jr., Basking Ridge, NJ (US); Laura Clemens, Colorado Springs, CO (US); Rodger Daniels, Boise, ID (US); Donald R. Fraser, Colorado Springs, CO (US); Deborah Levinson, Colorado Springs, CO (US); James Michael Reuter, Colorado Springs, CO (US); Susan Spence, Palo Alto, CA (US); Christopher Stroberger, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2687 days.

(21) Appl. No.: 11/264,571

(22) Filed: Oct. 31, 2005

(65) Prior Publication Data

US 2007/0100909 A1 May 3, 2007

(51) Int. Cl.
*G06F 17/30* (2006.01)
*G06F 11/20* (2006.01)

(52) U.S. Cl.
CPC ........ *G06F 11/2058* (2013.01); *G06F 11/2071* (2013.01); *G06F 11/2069* (2013.01); *G06F 11/2082* (2013.01)

USPC .......................................................... 707/610

(58) Field of Classification Search
USPC .................................................. 707/204, 633
See application file for complete search history.

(56) References Cited

U.S. PATENT DOCUMENTS

| | | | |
|---|---|---|---|
| 6,260,125 B1 | 7/2001 | McDowell | |
| 6,304,980 B1 * | 10/2001 | Beardsley et al. | 714/6 |
| 7,047,390 B2 * | 5/2006 | Factor et al. | 711/202 |
| 7,409,510 B2 * | 8/2008 | Werner et al. | 711/156 |
| 7,418,439 B2 * | 8/2008 | Wong | 1/1 |
| 2001/0055274 A1 | 12/2001 | Hegge et al. | |
| 2003/0014432 A1 * | 1/2003 | Teloh et al. | 707/204 |
| 2004/0044744 A1 * | 3/2004 | Grosner et al. | 709/217 |
| 2004/0078467 A1 | 4/2004 | Grosner et al. | |
| 2004/0090912 A1 * | 5/2004 | Loo | 370/217 |
| 2004/0117438 A1 | 6/2004 | Considine et al. | |
| 2005/0027748 A1 | 2/2005 | Kisley | |
| 2005/0038968 A1 * | 2/2005 | Iwamura et al. | 711/162 |
| 2005/0198247 A1 * | 9/2005 | Perry et al. | 709/223 |
| 2005/0226059 A1 * | 10/2005 | Kavuri et al. | 365/189.05 |
| 2005/0256972 A1 * | 11/2005 | Cochran et al. | 709/245 |
| 2006/0161808 A1 * | 7/2006 | Burkey | 714/6 |

* cited by examiner

*Primary Examiner* — Ajay Bhatia
*Assistant Examiner* — Fatima Mina (57) ABSTRACT

In a storage system, at least three storage sites are arranged in a full mirroring relationship using a virtual connection between instances of a storage group on two of the sites whereby no user data is transmitted.

21 Claims, 11 Drawing Sheets

502: ISSUE ADMINISTRATIVE COMMAND
FOR VIRTUAL CONNECTION

504: RECEIVE REQUEST FROM HOST

506: WRITE DATA TO LOCAL VIRTUAL DISKS ⟶  GROUP1 INSTANCE A

508: CREATE DATA PACKET CONTAINING DATA FROM HOST

510: ADD UNIQUE IDENTIFIER TO DATA PACKET

512: SEND DATA PACKET TO INSTANCE B

514: WAIT FOR INSTANCE B TO ACKNOWLEDGE THE WRITE TO THE VIRTUAL DISKS

516: PLACE DATA PACKET IN FIFO QUEUE FOR INSTANCE C

DATA MIRRORING USING A VIRTUAL CONNECTION

BACKGROUND

Multiple data copies can be maintained as part of a security function in data processing operations in case data is unavailable, damaged, or lost. Institutional users of data processing systems commonly maintain quantities of highly important information and expend large amounts of time and money to protect data against unavailability resulting from disaster or catastrophe. One class of techniques for maintaining redundant data copies is termed mirroring. Data processing system users maintain copies of valuable information on-site on a removable storage media or in a secondary mirrored storage site positioned locally or remotely. Offsite remote mirroring at locations within a metropolitan distance, for example up to about 200 kilometers, protects against local disasters including fire, power outages, or theft. Remote mirroring over geographic distances of hundreds of kilometers is useful for protecting against catastrophes such as earthquakes, tornados, hurricanes, floods, and the like. Many data processing systems employ multiple levels of redundancy to protect data, positioned at multiple geographic distances.

Data processing systems maintain remote copies using synchronous or asynchronous mirroring. Synchronous remote copies are typical when response time is relatively unimportant, distances between copy storage are short, and data cannot be lost. Synchronous mirroring generally enables more rapid recovery. In contrast, asynchronous mirroring is used to improve operating speed, impose the smallest possible performance impact on the primary site, and enable mirrored data to travel long distances. Asynchronous mirroring is often used for operations of very large geographical scale.

Data processing systems that store multiple mirrored copies extending over a range of distances may use synchronous links for some sites, generally relatively nearby sites within metropolitan distances, and asynchronous links for other sites. One risk of systems that combine synchronous and asynchronous mirroring is possibility of corrupted or unusable data when suspended links are not restored in a proper order.

For example, when a cascaded mirroring configuration sends data synchronously from site A to site B, and then sends the data asynchronously from site B to site C, site A does not contain information regarding what data that site B has actually sent to site C. Thus, if site B fails, site A must perform a full resynchronize process to site C even though much of the data already exists on site C.

SUMMARY

In accordance with an embodiment of a storage system, at least three storage sites are arranged in a full mirroring relationship using a virtual connection between instances of a storage group on two of the sites whereby no user data is transmitted.

BRIEF DESCRIPTION OF THE DRAWINGS

Embodiments of the invention relating to both structure and method of operation may best be understood by referring to the following description and accompanying drawings.

DETAILED DESCRIPTION

The illustrative apparatus and operating method relate to maintaining replication information by creating and managing a virtual connection to a destination site. In a cascaded mirroring configuration, a virtual connection enables an intermediate site to monitor data that a source site sends to a destination site.

Similarly, in a fan-out mirroring configuration, a source site sends data to two destination sites. For example, source site A may send data to two destination sites B and C. Site B may have no information of the data site A has sent to site C. A virtual connection enables site B to monitor data that site A sends to site C.

Virtual connections may be created in the context of a management model and usage architecture adapted for volume-to-volume replication.

A virtual connection may be used in cascaded configurations, for example configurations wherein Site A mirrors data to Site B and Site B further mirrors that data to Site C. In a cascaded configuration in the absence of a virtual connection, Site A cannot be certain of exactly what data is written to Site C. For example, the network link between Site B and Site C may be down causing data to be written to Site B but not to Site C. Therefore should Site B fail, in the absence of the virtual connection a user cannot establish a mirroring relationship between Site A and Site C without a full resynchronization of data.

To avoid requirement for full data resynchronization, Site A can maintain a virtual connection to Site C. The virtual connection is a connection wherein no user data is transmitted. Instead, a resynchronized condition may be attained though only small indicator messages sent between sites. Using virtual connections, Site A tracks data that Site B sends to the Site C, enabling the user to quickly establish a mirroring relationship between Site A and Site C without a full resynchronization of data.

Figure 1:
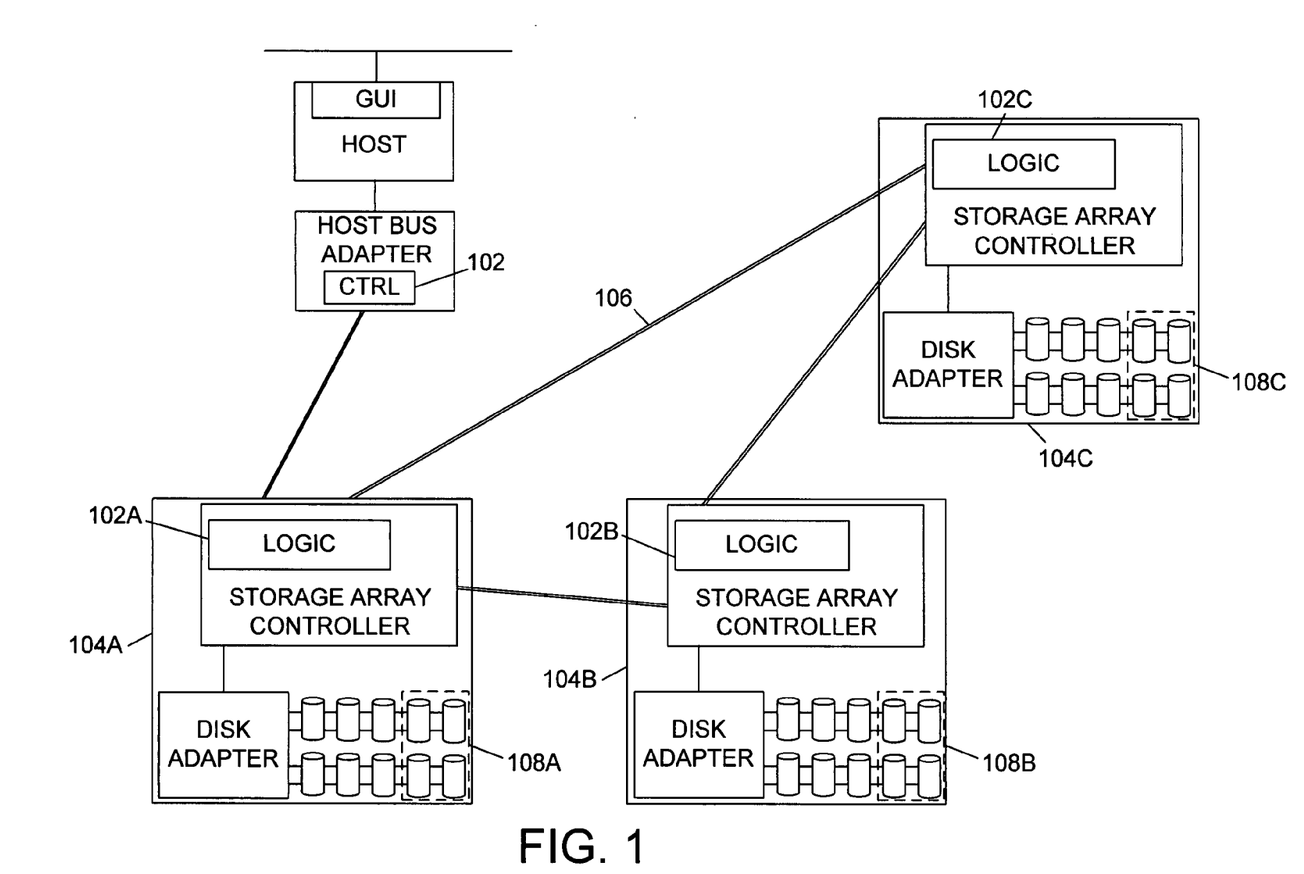
FIG. 1 is a schematic block diagram illustrating an embodiment of a data store apparatus with a data replication capability.

Referring to FIG. 1, a schematic block diagram illustrates an embodiment of a data store apparatus 100 with a data replication capability. The data store apparatus 100 comprises a controller adapted to manage data storage among at least three sites 104A, 104B, and 104C which are arranged in a mirroring configuration. The controller 102 is adapted to maintain a full mirroring relationship using a virtual connection 106 between instances 108A, 108C of a storage group on two of the sites 104A, 104C whereby no user data is transmitted.

In a typical embodiment, the controller may be arranged to execute in a host adapter controller 102, logic 102A, 102B, and/or 102C distributed among multiple sites 104A, 104B, and 104C, although any suitable arrangement of the controller 102 may be implemented. For example, host systems may contain host adapters that attach to array controllers, enabling usage of input/output services of the array controller. Array functions are typically implemented separate from host adapters. Array controllers are generally managed through a management interface which may take any of several forms. One implementation runs the management interface as an application on a host, using the host adapter and associated connections to the array controller to pass management commands using specialized "in-band" protocols. Another technique runs the management application on a separate management system that communicates with the array controller using dedicated connections. A third approach embeds a management application in an array controller which exposes the application through a network interface, for example a web browser connected to an array controller management Uniform Resource Locator (URL).

Figure 2:
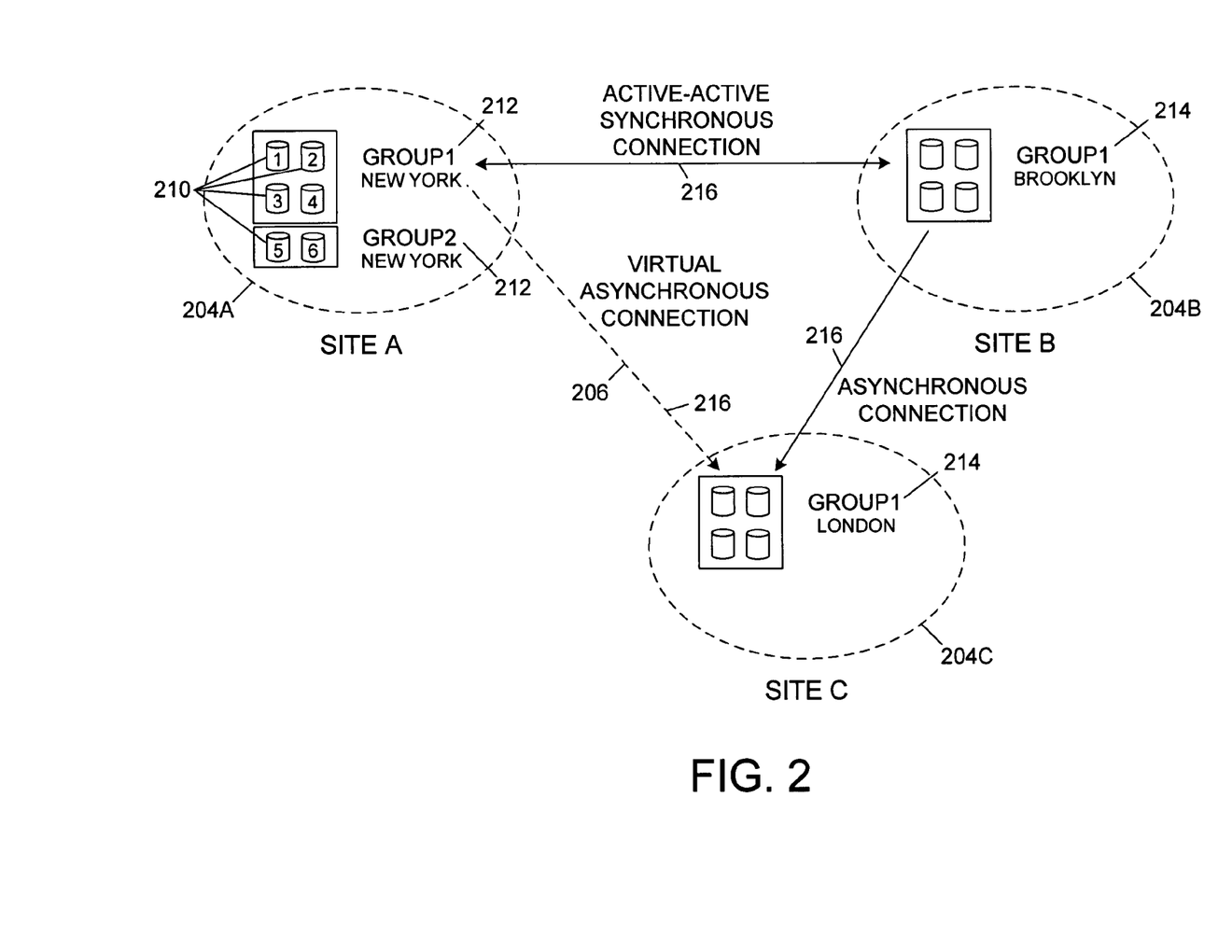
FIG. 2 is a schematic block diagram depicting an embodiment of a data store apparatus in a cascaded mirror configuration.

Referring to FIG. 2, a schematic block diagram illustrates an embodiment of a data store apparatus 200 in a cascaded mirror configuration. The data store apparatus 200 comprises a controller adapted to manage data storage in a cascaded mirroring configuration that sends data synchronously from site A 204A to site B 204B and then asynchronously from site B 204B to site C 204C. The controller is adapted to maintain a virtual connection 206 from site A 204A to site C 204C and monitor data that site B 204B sends to site C 204C, enabling site A 204A to establish a mirror relationship with site C 204C in event of site B failure.

A user can create the virtual connection 206 between site A 204A and site C 204C to enable site A 204A to monitor data on site C 204C. The virtual connection 206 does not send data from site A 204A to site C 204C but rather enables site A 204A to monitor the data that site B 204B sends to site C 204C.

In various cascaded environment embodiments, site A 204A may synchronously or asynchronously mirror data to site B 204B, and site B 204B asynchronously mirrors the data to site C 204C. Site A 204A does not inherently have information of the data site B 204B sends to site C 204C so if site B 204B fails, site A 204A has the task of re-establishing the mirroring relationship to site C 204C which, without the virtual connection 206, may impose a full resynchronization process. Full resynchronization can entail substantial expense and down-time. The virtual connection 206 may eliminate or reduce cost by enabling site A 204A to monitor data sent from site B 204B to site C 204C, so that site A 204A can rapidly establish the mirror relationship with site C 204C after site B 204B failure.

FIG. 2 illustrates several objects which are defined in an illustrative management model. Volumes 210 are logical units of storage presented to hosts. Groups 212 are objects that contain a set of volumes. Replicas 214 are mirrored copies of a group. Connections 216 internally link the replicas. In the management model, storage is replicated in groups 212 which contain a set of zero or more volumes 210. A group 212 is a collection of volumes 210. Volumes 210 in a group 212 maintain write consistency across the volumes 210 in the group 212. For example, if a database application uses four volumes to hold database extents, the four volumes may be placed in a group. Because groups 212 can be replicated, each replica 214 has an instance name which an administrator may use to differentiate replicas 214 in the group 212.

In FIG. 2, a user has configured groups 212 named group1 containing volume1, volume2, volume3, and volume4 and named group2 containing volume5 and volume6 at site A 204A. The user has assigned the instant name New York to the first instance of group1 and to the first instance of group2.

A replica 214 of a group 212 is a mirrored copy of the group. Each replica is associated with a site and is identified by a unique instance name within the group. A replica has a peer which can be any instance of the group. The peer specifies where the mirroring takes place. The data store apparatus 200 has three replicas of group1 including the original instance, a replica in site B 204B with an instance name of Brooklyn, and a replica in site C 204C with an instance name of London.

Connections 216 between replicas 214 define mirroring relationships of the replicas. For example, the user when creating the Brooklyn instance of group1 may specify the New York instance as the replica's peer in an active-active synchronous mirroring relationship. Furthermore, the user when creating the London instance may specify the Brooklyn instance as the replica's peer in an asynchronous mirroring relationship. The New York instance is mirrored to the Brooklyn instance and the Brooklyn instance is mirrored to the London instance. Accordingly, two connections 216 are established including an active-active synchronous connection between the New York instance of group1 and the Brooklyn instance, and an asynchronous connection between the Brooklyn instance of group1 and the London instance.

The user can exploit the asynchronous connection between the Brooklyn instance of group1 and the London instance, and create the virtual 206 asynchronous connection between the New York instance of group1 and the London instance. The virtual connection 206 between the New York instance and the London instance is a connection wherein no data is transmitted. Instead, the New York instance tracks data that the Brooklyn instance sends to the London instance, enabling the New York instance to establish a mirroring relationship with the London instance should the Brooklyn instance fail or otherwise disappear.

The management model manages volumes, groups, replicas, and connections. Groups can be created and destroyed. Connections between replicas can be disconnected and reestablished.

A usage model defines actions for defining groups and configuring a mirrored environment. A group can be created by issuing an administrative command that specifies attributes of the group including the group name, instance name of the first instance in the group, site to which the instance of the group belongs, and establishing volumes in the group. The group is created and contains the specified volumes with a single instance in the named site. The group has no replicas. To create the configuration shown in FIG. 2, site A, the user issues two commands, one command to create group1 with an initial instance of New York in site A 204A containing volumes 1 through 4, and another command to create group2 with an initial instance name of New York in site A 204A containing volumes 5 and 6.

After a group is created, the user can create one or more replicas of the group. A user creates a replica by issuing an administrative command that specifies attributes of the replica including the instance name of the replica, the name of the group associated to the replica, the site on which the replica resides, name of the peer instance, and replica type. Replica types include sources or targets for either synchronous or asynchronous replication, or member of an active-active synchronous replication pair.

Once the user creates the replica, management logic creates a connection between the replica and the peer. The illustrative configuration results from two commands. A first command creates the Brooklyn instance from group1 on site B 204B with associated peer the New York instance as a member of an active-active synchronous replication pair. A second command creates the London instance from group1 on site C 204C with the peer the Brooklyn instance as the target of an asynchronous replication pair.

The user further creates the virtual connection 206 in which no data are transmitted. The virtual connection 206 enables the connection source to monitor data sent to the connection target. The user creates the virtual connection 206 by issuing an administrative command specifying virtual connection attributes including source replica, destination replica, and information replica of the virtual connection. The information replica informs the source replica of data transmitted to the destination replica.

In the illustrative configuration, the user may want to create a virtual connection between the New York instance of group1 and the London instance. Otherwise, the user may choose not to create a virtual connection that would avoid the overhead of a virtual connection but incur a higher cost of creating a mirroring relationship between the New York instance and the London instance should the Brooklyn instance crash.

A user creates the illustrative virtual connection by issuing a command that specifies the virtual connection source as the New York instance of group1, the virtual connection destination as the London instance, and the information replica as the Brooklyn instance.

In the resulting configuration, the New York instance tracks all data sent to the Brooklyn instance. The Brooklyn instance periodically sends a message to the New York instance indicating the data sent from the Brooklyn instance to the London instance. Accordingly, the New York instance tracks data that the Brooklyn instance sends to the London instance, enabling the user to quickly establish a mirror relationship between the New York instance and the London instance if the Brooklyn instance crashes.

After the group is created, the user may add or remove volumes from any instance in the group, automatically updating volumes for all replicas.

Figure 3:
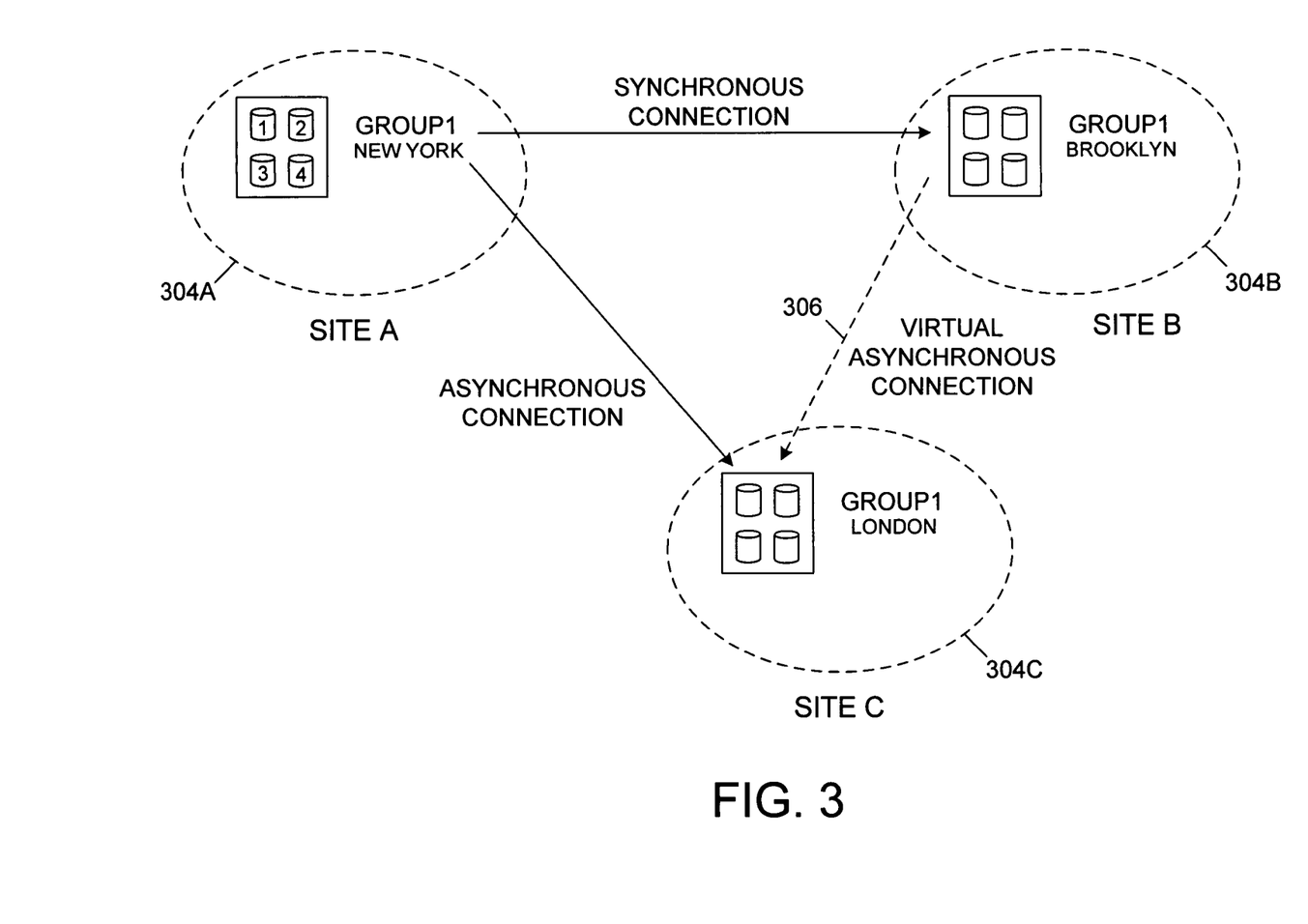
FIG. 3 is a schematic block diagram showing an embodiment of a data store apparatus in a fan-out mirroring configuration.

Referring to FIG. 3, a schematic block diagram illustrates an embodiment of a data store apparatus 300 in a fan-out mirroring configuration. The data store apparatus 300 comprises a controller adapted to manage data storage in a fan-out mirroring configuration that sends data from site A 304A to site B 304B and to site C 304C. The controller maintains a virtual connection 306 that enables site B 304B to monitor data that site A 304A sends to site C 304C. Site B 304B establishes a mirror relationship with site C 304C in event of site A failure.

The data store apparatus 300 with virtual connection 306 avoids full resynchronization in the fan-our mirroring configuration in a manner similar to operation in the cascade mirroring configuration. When site A 304A sends data to both site B 304B and site C 304C, site B 304B has no information relating to data on site C 304C. Similarly, site C 304C has no information relating to data on site B 304B. The virtual connection 306 enables site B 304B to monitor data that site A 304A sends to site C 304C, and enables site C 304C to monitor data that site A 304A sends to site B 304B. Therefore, if site A 304A fails, site B 304B can quickly establish a mirror relationship with site C 304C.

In contrast to the creation and maintenance of virtual connections, synchronization may be maintained despite site failure by maintaining normal connections between all sites. For example, in the cascaded configuration wherein site A sends data to site B which in turn sends the data to site C, site A can send data directly to site C as well as site B. Site C can simply disregard any duplicate data received from both site B and site C. However, a fully-connected configuration that sends data between all nodes in a cascaded or fan-out configuration results in difficulty due to tremendous network overhead.

The controller is adapted to create a virtual connection upon receipt of an administrative command that specifies virtual connection attributes including source site designation, destination site designation, and information site designation. In the illustrative examples, the source site of the virtual connection is depicted as site A, the destination site is shown as site C, and the information site is illustrated by site B. The information site is configured to inform the source site of data transmission to the destination site. In the cascaded configuration, the information site is the target of a mirror relationship with the source site.

When the virtual connection is established, the source site logs all data sent by the source site to the information site. The log may be simply an ordered list of write operations that the source site sends to the information site. The information site sends the data to the information site's mirror, for example the destination site of the source site's virtual connection. Once the information site receives confirmation that the data is successfully written to the destination site, the information site sends a brief message to the source site, informing the source site that the corresponding data can be removed from the source site log.

If the information site crashes, the source site can send the remainder of the source site log to the destination site, causing the source and destination sites to be synchronized.

Similar operations may be performed in a fan-out configuration whereby, for example, site A mirrors data to site B and to site C. Site B is the source of the virtual connection. Site A is the information site and site C is the destination site. When site A sends data to site B, site B logs the data until confirmation is received from site A informing that site C has the data.

In the cascaded or fan-out mirroring configuration, the virtual connection enables administrators to quickly establish mirroring relationships after a site failure occurs. For example, in a fan-out configuration whereby site A sends data to both site B and site C, the virtual connection enables site B to establish a mirroring relationship with site C without performing a full synchronization process, should site A fail.

Figure 4A:
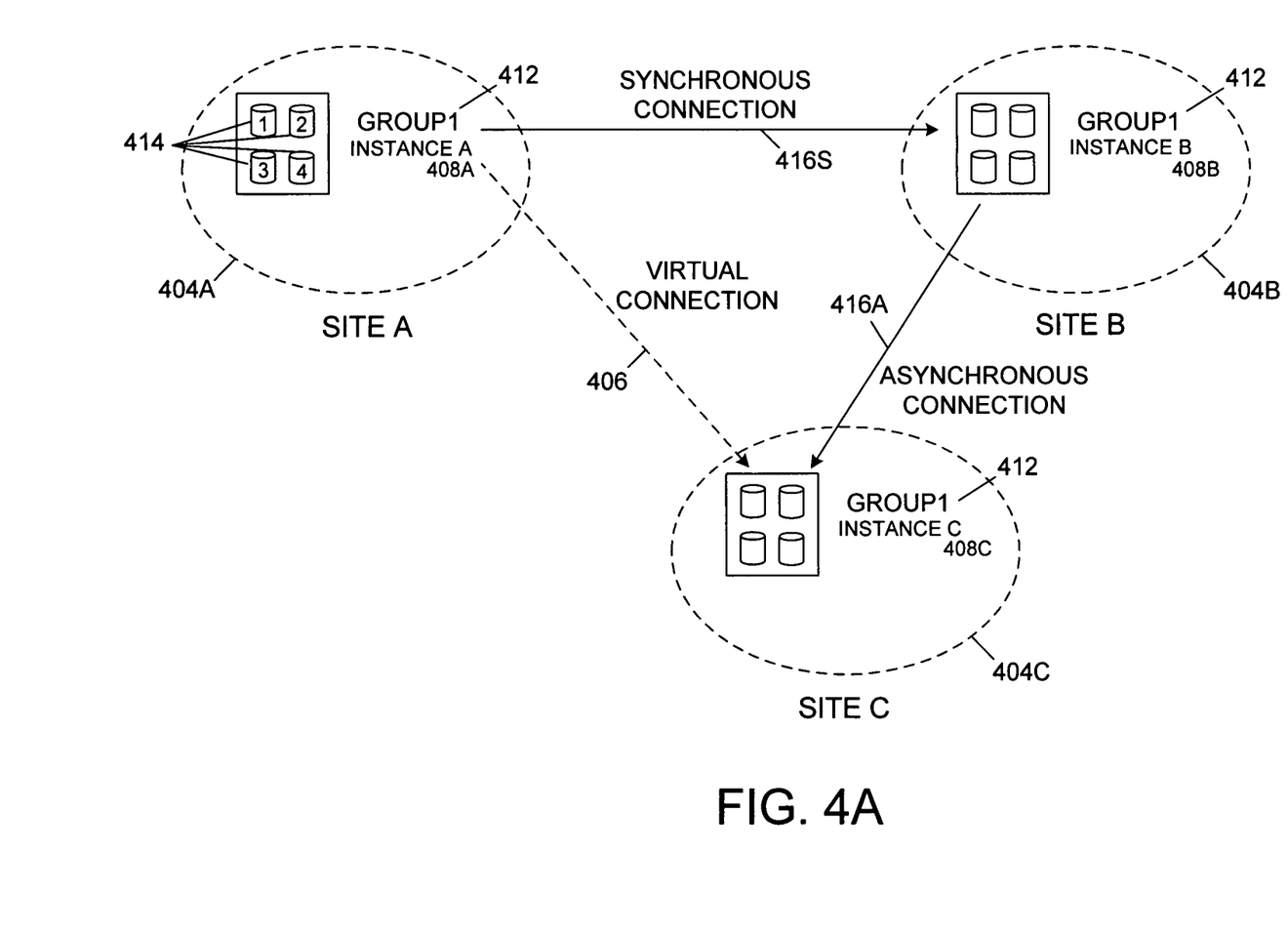
FIG. 4A is a schematic block diagram illustrating an embodiment of a data system configured for data replication using a virtual connection.

Referring to FIG. 4A, a schematic block diagram illustrates an embodiment of a data system 400 configured for data replication using a virtual connection. The data system 400 comprises at least three storage sites 404A, 404B, 404C arranged in a full mirroring relationship using a virtual connection 406 between instances 408A and 408C of a storage group on two of the sites whereby no user data is transmitted.

A virtual connection 406 is a software construct that enables a user to maintain a full mirroring relationship in a cascaded configuration. For example, if Site A 404A mirrors data to Site B 404B, and Site B 404B further mirrors that data to Site C 404C, then the virtual connection 406 enables the user to quickly establish a mirroring relationship between Site A 404A and Site C 404C without requiring full resynchronization of data, should Site B fail.

The data system 400 may implement a management model for data replication within the data system framework that enables the user to replicate a consistency group 412 containing a set of zero or more virtual disks 414. The management model defines virtual disks 414, consistency groups 412, instances 408, and connections.

In the illustrative example, a group 412 named group1, and an instance of group1 named instanceA 408A in Site A 404A contains virtual disks 1, 2, 3, and 4. An instance of group1 named instanceB 408B is in Site B 404B. An instance of group1 named instanceC 408C is in Site C 404C. A synchronous connection 416S replicates from instanceA 408S to instanceB 408B. An asynchronous connection 416A replicates from instanceB 408B to instanceC 408C.

Figure 4B:
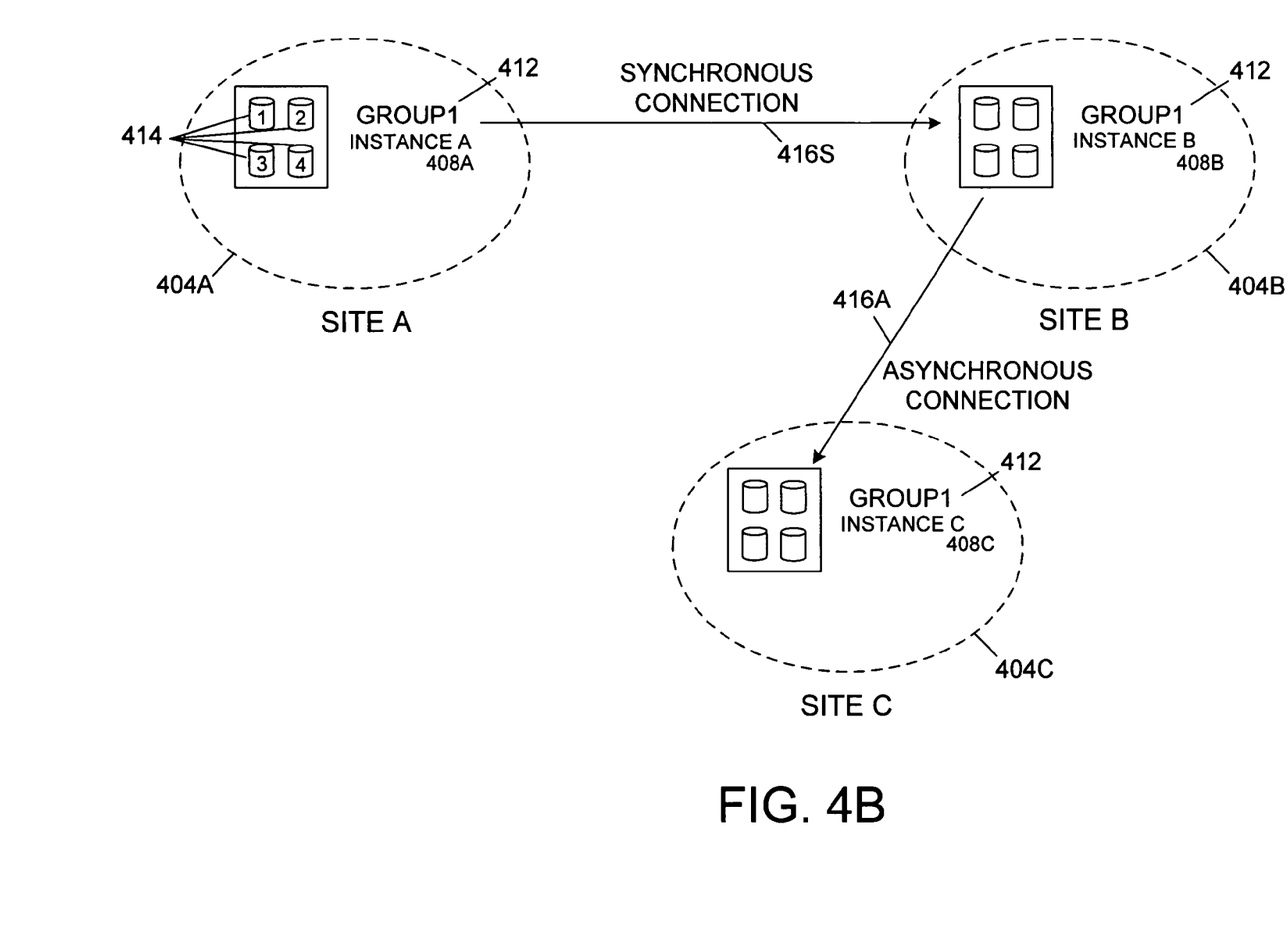
FIG. 4B is a schematic block diagram showing an embodiment of the data system before creation of the virtual connection.

Referring to FIG. 4B, a schematic block diagram illustrates an embodiment of the data system 400 before creation of the virtual connection 406. The data system 400 has a cascaded configuration with data mirrored from instanceA 408A to instanceB 408B, and then cascaded to instanceC 408C. An implicit relationship exists between instanceA 408A and instanceC 408C, instanceA 408A does not have sufficient information regarding data that has been transmitted to instanceC 408C because, for example, the network link between Site B 404B and Site C 404C may be down. If Site B 404B crashes, the user could not establish a mirroring relationship between instanceA 408A and instanceC 408C without performing a full copy of the virtual disks 414. InstanceA 408A maintains no information about what data has been written to instanceC 408C.

The configuration depicted in FIG. 4A enables a solution to the problem, enabling the user to create a virtual connection 406 between instanceA 408A and instanceC 408C. The virtual connection 406 between instanceA 408A and instanceC 408C is a connection wherein no user data is transmitted. Instead, instanceA 408A tracks data that instanceB 408B sends to instanceC 408C, enabling the user to establish a mirroring relationship between instanceA 408A and instanceC 408C should Site B fail.

The data system 400 further comprises logic executing at the storage sites 404A, 404B, 404C and adapted to create the virtual connection 406 upon receipt of an administrative command. The user creates the virtual connection 406 by issuing an administrative command that specifies the attributes of the virtual connection 406. The virtual connection attributes include a source instance designation, a destination instance designation, and an information instance designation. The information instance informs the source instance that data has been transmitted to the destination instance. The virtual connection 406 ensures data transfer from the source instance to the destination instance.

In the configuration depicted in FIG. 4A, the user creates a virtual connection 406 between instanceA 408A and instanceC 408C, specifying instanceB 408B as the information instance. The user may choose not to create the virtual connection 406, avoiding the overhead of a virtual connection but incurring the higher cost of creating a mirroring relationship between instanceA 408A and instanceC 408C should Site B 404B crash.

When the user creates a virtual connection 406 between instanceA 408A and instanceC 408C, instanceA 408A sends an initial message to the information instance, instanceB 408B in the illustrative example. The initial message indicates that instanceB 408B is the information instance for the virtual connection 406 between instanceA 408A and instanceC 408C. The message contains at least three indicators. A first indicator designates that the receiving instance, here instanceB 408B, is requested to be the information instance. The second indicator designates the source of the virtual connection, exemplified by instanceA 408A. The third indicator informs of the destination of the virtual connection, shown as instanceC 408C.

Upon receipt of the message, instanceB 408B verifies status as the second hop on the cascaded configuration. Specifically, instanceB 408B verifies that the user has configured instanceB 408B as the target of a connection with the source instanceA 408A and that the user has configured instanceB 408B as the source of a connection with the target instanceC 408C. InstanceB 408B sends a response message indicating success if the configuration is correct or failure if the configuration is incorrect.

In case instanceA 408A receives the success message from instanceB 408B, instanceA 408A establishes a queue of entries for instanceC 408C, just as if instanceC 408C were the target of an asynchronous mirroring relationship.

In an illustrative embodiment, logic executable in association with information instanceB 408B receives the data packet from source instanceA 408A and writes the data packet to virtual disks 414 local to information instanceB 408B. Information instanceB 408B returns acknowledgement when the data packet is successfully written to source instanceA 408A and queues data packets to be sent to destination instanceC 408C in storage local to information instanceB 408B.

Logic associated with the information instanceB 408B sends queued data packets to the destination instanceC 408C and waits for acknowledgement from destination instanceC 408C of successful writing to destination instance virtual disks 414. For acknowledgement of successful writing of data to the destination instanceC 408C, information instanceB 408B removes data packets from the queue and returns acknowledgement of successful data packet transfer to destination instanceC 408C to source instanceA 408A.

The data system 400 further includes a logic associated with the destination instance instanceC 408C that receives the data packet from the information instance instanceB 408B and writes the data packet to virtual disks 414 local to the destination instance instanceC 408C. The destination instance logic records identification of the written data packet and returns acknowledgement of successful writing of the data packet to the information instance instanceB 408B.

Figure 5A:
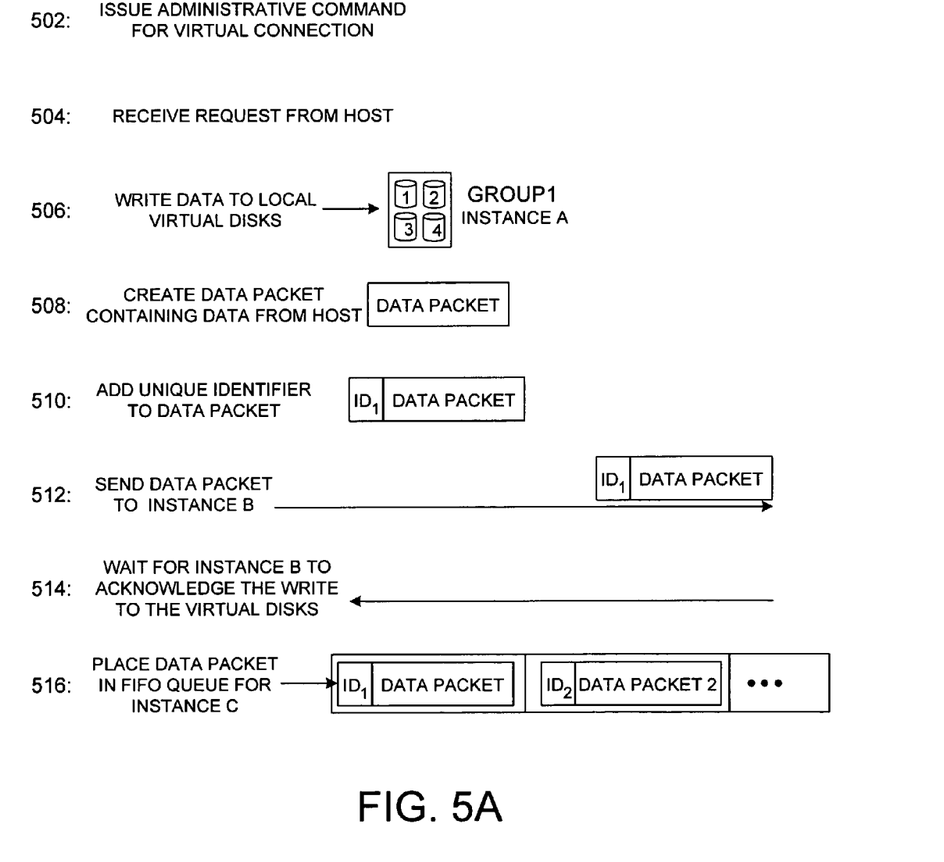
FIGS. 5A, 5B, 5C, 5D, and 5E are schematic event and block diagrams illustrating an embodiment of a method for operating a virtual connection in a replication application.

Referring to FIGS. 5A, 5B, 5C, 5D, and 5E, schematic event and block diagrams illustrate an embodiment of a method for operating a virtual connection in a replication application. FIG. 5A illustrate actions 500 executed by a source instance in response to a write request to one of the mirrored virtual disks. The user issues 502 an administrative command for creating the virtual connection that specifies virtual connection attributes including designation of a source instance, designation of a destination instance, and designation of an information instance. The administrative command designates that the source instance is to transfer data to the destination instance and creates the virtual connection between the source instance and the destination instance.

The designated source instance, illustratively instanceA 408A, receives 504 the request from the host. The source responds to the request by writing 506 data to virtual disks local to the source instanceA. The source instanceA creates 508 a data packet containing, among other things, the data to be mirrored. The source instanceA also adds 510 a unique identifier to the data packet. In an illustrative embodiment, the unique identifier increases numerically in value with sequential requests. In the example, because the information instance, illustratively instanceB, is the target of a synchronous connection, the source instanceA sends 512 the data packet that contains the unique identifier to the information instanceB.

Source instanceA waits 514 for the acknowledgment that the information instanceB has succeeded in writing the data to virtual disks. The source instance places 516 the data packet in a queue. The data packet has the same unique identifier as the identifier sent to information instanceB in action 512. Because the queue is used to track a virtual connection and not an asynchronous mirroring connection, the data packets in the queue are not sent to the destination instanceC. The queue simply tracks data in transit to the destination instanceC through the information instanceB.

If the network connection between the source instanceA and the destination instanceB is inoperative, the source instanceA cannot send the data to information instanceB. In the case of the inoperative connection, source instanceA queues the data directed to information instanceB and also places the data in a queue for the destination instanceC. The queue for holding data to the information instanceB is separate from the queue used to hold destination instanceC data. Accordingly, the queue for destination instanceC contains all data written to source instanceA but that may not have been applied to the destination instanceC.

Figure 5B:
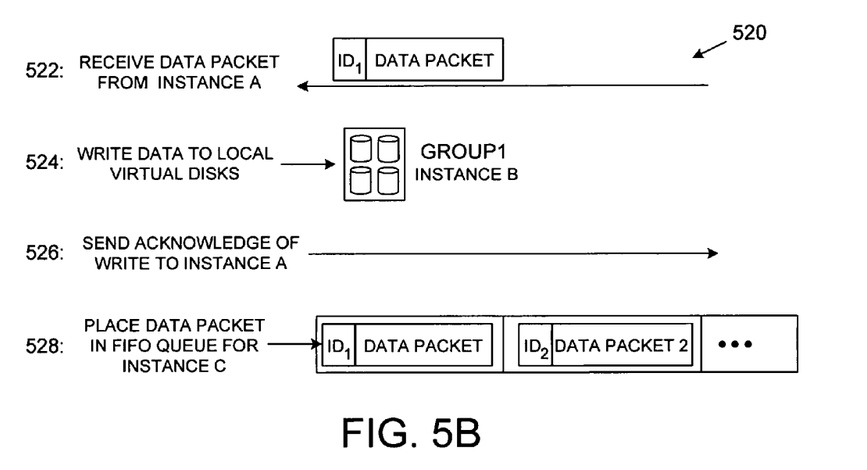

FIG. 5B shows actions 520 executed by the information instanceB in response to receipt of a data packet from the source instanceA. The information instanceB reads 522 the data packet received from source instanceA. The information instanceB then writes 524 data from the packet to target virtual disks local to the information instanceB and sends 526 acknowledgement to the source instanceA indicating successful writing of the data. Then, because the information instanceB is the source of an asynchronous mirror to destination instanceC, the information instanceB queues 528 the data to be sent to destination instanceC.

Because the unique identifier in the illustrative embodiment has a numerically increasing value, the identifier is used at the information instanceB and the destination instanceC to avoid the sending of stale or retransmitted data originating from source instanceA. Both information instanceB and destination instanceC record the identifier of the last data packet written to the virtual disks. The data messages are typically sent using a transport protocol that maintains data ordering, for example Transmission Control Protocol (TCP), so the messages are not delivered out-of-order by the underlying transport provider. An instance may resend data when a connection is dropped and then re-established. Additionally, if the unique identifier is to be reset, for example to 0, source instanceA sends a "reset" message to information instanceB. When information instanceB receives the reset message, information instanceB places the reset message in the queue for destination instanceC.

Figure 5C:
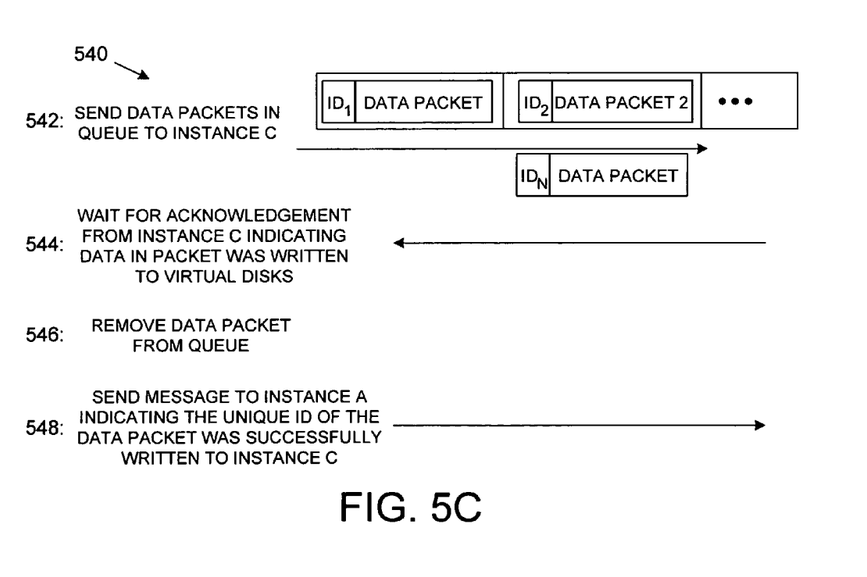

FIG. 5C shows actions 540 executed by the information instanceB for processing the information instance queue for the asynchronous connection to the destination instanceC. The information instanceB sends 542 data packets in the information instance queue to destination instanceC. In an illustrative embodiment, information instanceB sends the data packets in a first-in-first-out order, preserving the order of write requests.

Information instanceB waits 544 for acknowledgement from destination instanceC signifying that the destination instanceC has successfully written data to target virtual disks local to the destination instanceC. Upon acknowledgement, information instanceB removes 546 the data packet from the queue local to information instanceB.

In operation as the information instance for the virtual connection between source instanceA and destination instanceC, the information instanceB sends 548 an acknowledgment to source instanceA specifying successful writing of the data packet to destination instanceC. The data packet's unique identifier is included in the acknowledgment.

Figure 5D:
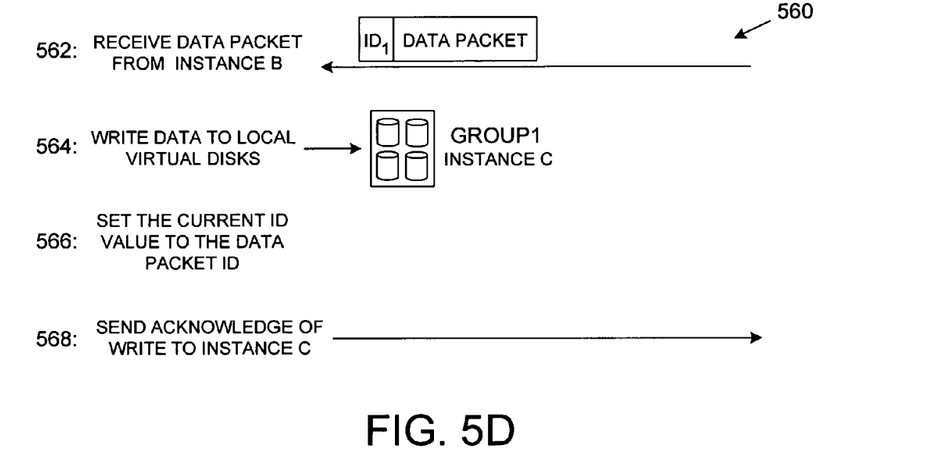

FIG. 5D shows actions 560 executed by the destination instanceC upon receipt of data from the information instanceB. The destination instanceC reads 562 the data packet from the information instanceB and writes 564 data from the data packet to virtual disks local to the destination instanceC. The destination instanceC records 566 the identifier number of the data packet. Because the identifier number is numerically increasing, the identifier is used to avoid repeating data. Specifically, if a data packet containing an identifier that is numerically less than the recorded identifier, the destination instanceC does not write that data. Destination instanceC sends 568 acknowledgement of successful writing of the data back to the information instanceB.

Figure 5E:
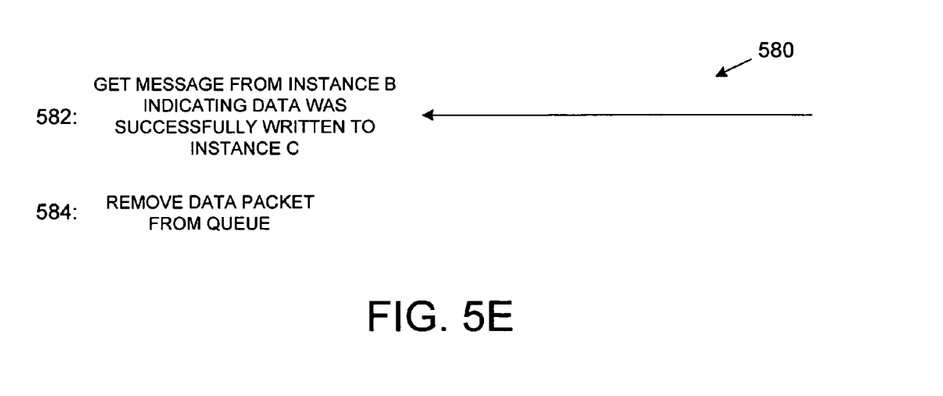

FIG. 5E shows actions 580 executed by the source instanceA for successful replication. The source instanceA receives 582 acknowledgement from information instanceB indicating that the destination instanceC has successfully written the data received from the information instanceB. In response to the acknowledgement, the source instanceA removes 584 the data packet from the queue.

The queue local to source instanceA tracks all data written to virtual disks local to the source instanceA but not yet acknowledged as being written to the destination instanceC. If Site B crashes, source instanceA retains the internal queue including a list of data elements to be sent to destination instanceC to establish a full mirroring relationship.

Accordingly, a user can establish a new mirroring relationship between source instanceA and destination instanceC by issuing an administrative command that drains the queue and begins a mirroring relationship. As soon as the queue is drained, the virtual disks on source instanceA and destination instanceC are synchronized.

Destination instanceC records the identifier number of the last data packet written to the destination instance virtual disks. Therefore, if the queue local to source instanceA contains data already written to destination instanceC, then destination instanceC does not re-write that data to virtual disks on destination instanceC. For example, information instanceB may crash after destination instanceC processes the message but before information instanceB has opportunity to inform source instanceA.

Virtual connections can be used in cascaded environments, for example configurations whereby Site A mirrors data to Site B and Site B further mirrors the data to Site C. The virtual connections address the difficulty of otherwise imposing a full resynchronization of data if the user wants to establish a mirroring relationship directly between Site A and Site C.

The queue on source instanceA may eventually contain many elements. For example, if the network link between information instanceB and destination instanceC is down, source instanceA continues to place data elements in the queue. If the queue fills on source instanceA, then source instanceA processes the queue and places information about each data element into a bitmap. In a specific embodiment depicted in FIG. 6 a flow chart illustrates source instanceA handling 600 data queuing using the bitmap. Source instanceA is adapted to perform several operations. Source instanceA takes 602 individual elements out of the queue and sets 604 a bit in a bitmap corresponding to that data element.

Figure 6:
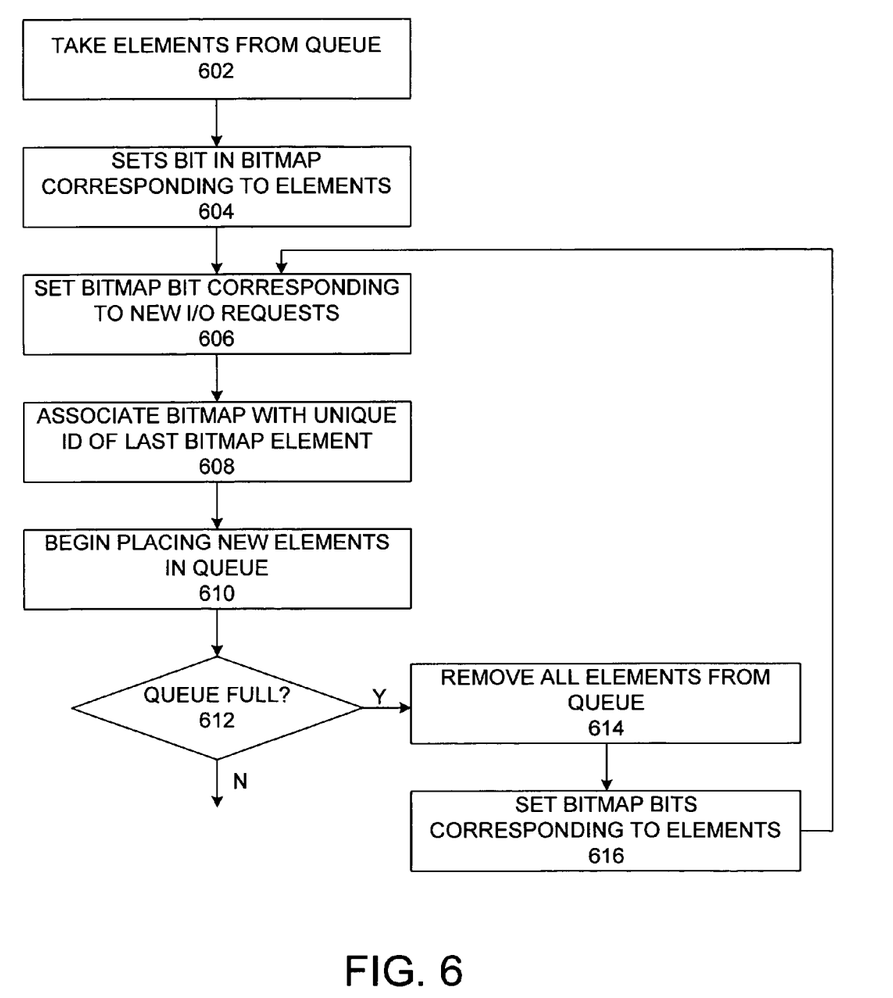
FIG. 6 is a flow chart showing an embodiment of a method for handling queuing which is suitable for usage in operating the virtual connection.

While processing the queue, source instanceA sets 606 a bit in the bitmap corresponding to all new input/output (I/O) requests. After processing all queue elements and setting bits in the bitmap, source instanceA associates 608 with the bitmap the unique ID of the last data element that was placed in the bitmap. The last data element is obtained either from the queue or from an input/output (I/O) operation occurring while the queue is drained. Source instanceA begins 610 placing new data elements in the queue. If the queue again is filled 612, source instanceA removes 614 all elements from the queue and sets 616 a bit in the bitmap corresponding to the data elements and returns to queue processing in action 606.

The unique identifier (ID) associated with the bitmap indicates the last data packet for which a bit was set in the bitmap. Therefore, when the information instance acknowledges sending of the unique identifier (ID) associated with the bitmap, source instanceA can discard the bitmap.

If the user wants to create a connection between source instanceA and destination instanceC when source instanceA still has the bitmap, source instanceA merges all remaining queue elements into the bitmap, then performs a bitmap-based resynchronization to destination instanceC. During the resynchronization process, virtual disks on destination instanceC may not be in a consistent state because a bitmap-based resynchronization may not guarantee write order. However, virtual disks on destination instanceC are in a consistent state when the resynchronization process is complete.

Figure 7A:
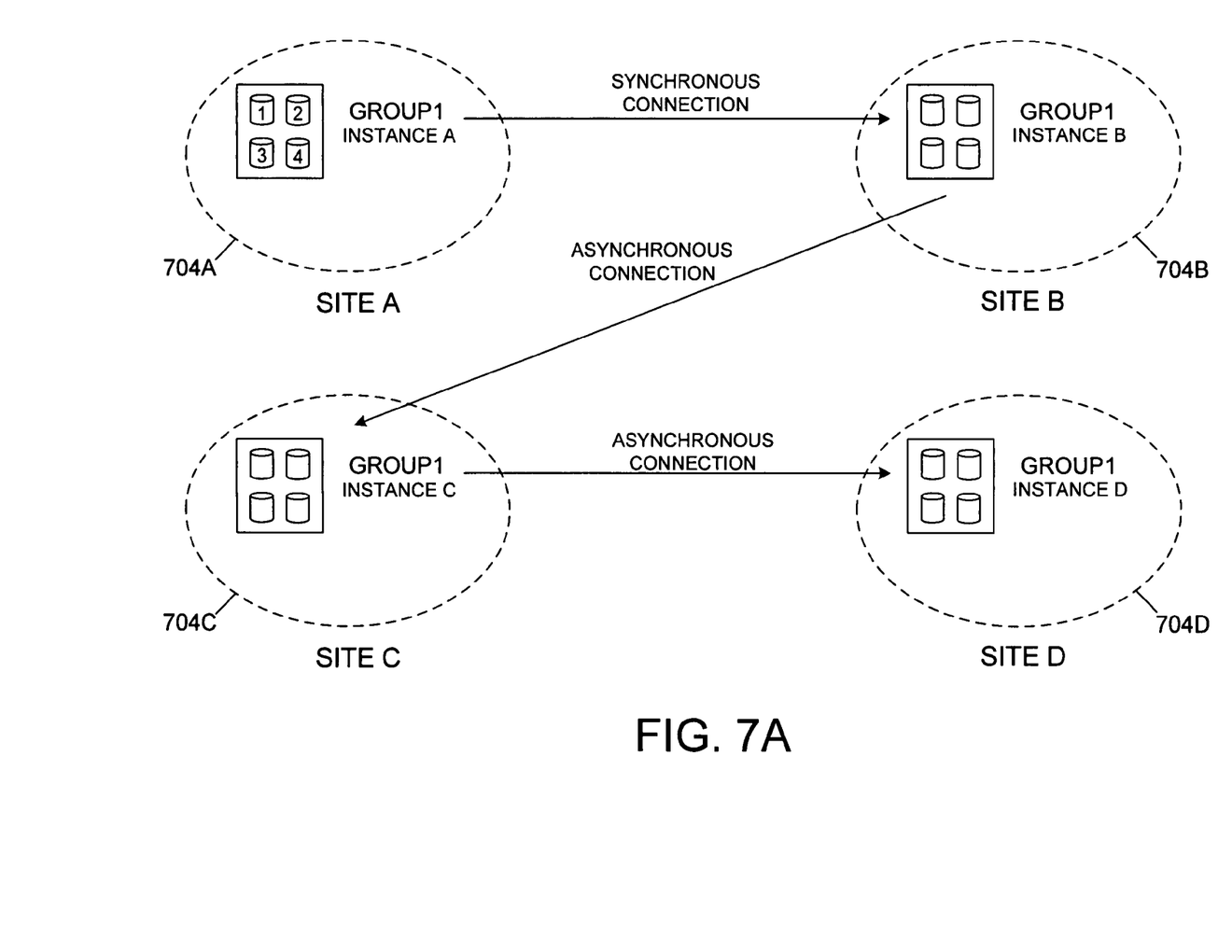
FIGS. 7A and 7B are schematic block diagrams showing embodiments of multiple-cascaded environments.
Figure 7B:
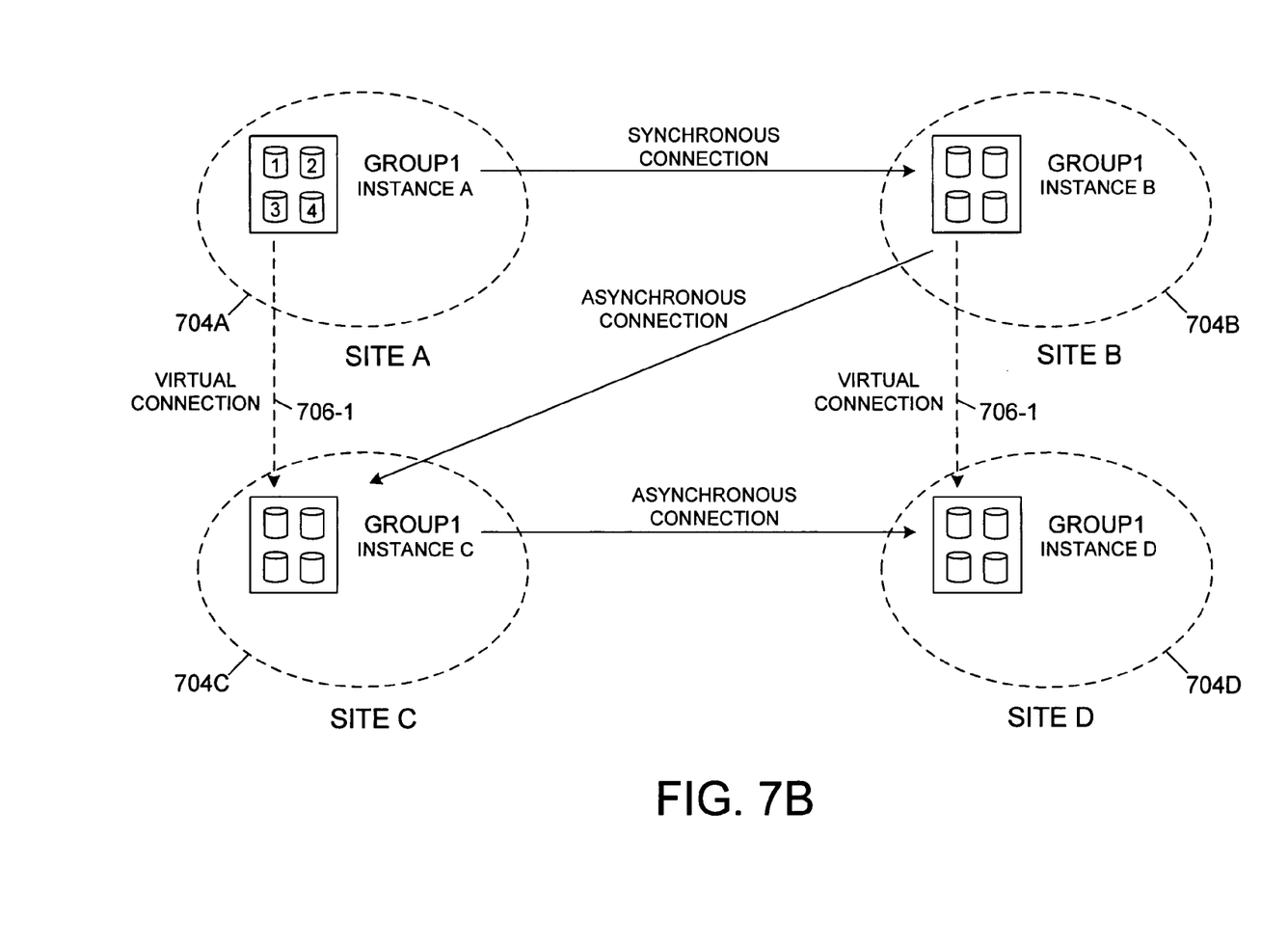

Virtual connections can exist in multiple cascaded environments. Referring to FIGS. 7A and 7B, schematic block diagrams show embodiments of multiple-cascaded environments. For example, as shown in FIG. 7A, a user can have a configuration 700 that mirrors data from instanceA 704A to instanceB 704B, then further mirrors the data to instanceC 704C, which further mirrors the data to instanceD 704D.

In the multiple-cascaded environment, the user can create virtual connections between any three-way cascaded configurations. For example, as shown in FIG. 7B, the user can create a first virtual connection 706-1 between instanceA 704A and instanceC 704C using instanceB 704B as the information instance, and a second virtual connection 706-2 between instanceB 704B and instanceD 704D using instanceC 704C as the information instance.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, although the illustrative structures and techniques are described with respect to a particular number and arrangement of sites or nodes, any suitable number may be implemented. Similarly, the disclosed structures and methods may be adapted for usage with any appropriate types of electronics or computer systems.

What is claimed is:

1. A data store apparatus comprising:
   a controller that manages data storage among at least three sites, each site comprising a hard drive, arranged in a mirroring configuration, the controller maintaining a full mirroring relationship using a virtual connection between instances of a storage group on two of the at least three sites whereby no user data is transmitted on the virtual connection and data on the virtual connection is monitored through a third site.

2. The data store apparatus according to claim 1 further comprising:
   the controller managing data storage in a cascaded mirroring configuration that sends data synchronously from a site A to a site B and then asynchronously from the site B to a site C, the controller maintaining the virtual connection from the site A to the site C and monitoring data that the site B sends to the site C, enabling the site A to establish a mirror relationship with the site C in event of site B failure.

3. The data store apparatus according to claim 1 further comprising:
   the controller managing data storage in a fan-out mirroring configuration that sends data from a site A to a site B and a site C, the controller maintaining the virtual connection that enables the site B to monitor data that the site A sends to the site C, enabling the site B to establish a mirror relationship with the site C in event of site A failure.

4. The data store apparatus according to claim 1 further comprising:
   the controller creating the virtual connection upon receipt of an administrative command specifying virtual connection attributes including source site designation, destination site designation, and information site designation, the information site informing the source site of data transmission to the destination site.

5. The data store apparatus according to claim 1 further comprising:

the controller creating the virtual connection upon receipt of an administrative command specifying virtual connection attributes including designation of a source instance, designation of a destination instance, and designation of an information instance that informs the source instance of data transfer to the destination instance, the controller creating the virtual connection between the source instance and the destination instance.

6. The data store apparatus according to claim 5 further comprising:
the controller causing the source instance to send an initial message to the information instance, the initial message physically identifying sites of the source, destination, and information instances; and
the controller causing the information instance to verify position in the mirror configuration and to respond to the source instance indicating success for a successful configuration and indicating failure for unsuccessful configuration.

7. The data store apparatus according to claim 6 further comprising:
the controller causing the source instance to respond to successful configuration of the information instance by queuing entries for the destination instance as a target of an asynchronous mirroring relationship; and
the controller causing the source instance to receive a request, write to local virtual disks according to the request, create a data packet containing at least data to be mirrored, uniquely identify the data packet, send the data packet to the information instance, wait for information instance acknowledgement of successful writing to information instance virtual disks, and queue the data packet local to the source instance.

8. The data store apparatus according to claim 7 further comprising:
the controller causing the information instance to receive the data packet from the source instance, write the data packet to the information instance virtual disks, return acknowledgement of data packet successful writing to the source instance, and queue data packets to be sent to the destination instance local to the information instance; and
the controller causing the information instance to send the queued data packets to the destination instance, wait for destination instance acknowledgement of successful writing to destination instance virtual disks, remove data packets from the queue in response to destination instance acknowledgement of writing the data packets, and return acknowledgement of data packet successful writing in the destination instance to the source instance.

9. The data store apparatus according to claim 8 further comprising:
the controller causing the destination instance to receive the data packet from the information instance, write the data packet to the destination instance virtual disks, record identification of the written data packet, and return acknowledgement of data packet successful writing to the information instance.

10. The data store apparatus according to claim 7 further comprising:
the controller causing the information instance to respond to a full queue comprising removing individual data elements from the queue, setting a bit in a bitmap corresponding to an individual data element, setting a bit in the bitmap corresponding to new input/output (I/O) requests, associating with the bitmap a unique identifier (ID) of a last data element placed in the bitmap, placing new data elements in the queue, removing all data elements from the queue and setting a bit in the bitmap corresponding to the removed data elements on detection of a full queue condition, and continuing queuing the data packets local to the source instance.

11. A data system comprising:
at least three storage sites, each site comprising a hard drive, arranged in a full mirroring relationship using a virtual connection between instances of a storage group on two of the sites whereby no user data is transmitted on the virtual connection and data on the virtual connection is monitored through a third site.

12. The data system according to claim 11 further comprising:
a management model enabling a user to replicate a consistency group containing a set of zero or more virtual disks.

13. The data system according to claim 11 further comprising:
a logic executable at the storage sites that creates a virtual connection upon receipt of an administrative command that specifies virtual connection attributes including a source instance designation, a destination instance designation, and an information instance designation, the virtual connection adapted to ensure data transfer from a source instance to a destination instance.

14. The data system according to claim 13 further comprising:
a logic executable at the storage sites that causes the source instance to send an initial message to the information instance, the initial message physically identifying storage sites associated with the source, destination, and information instances;
the logic causing the information instance to verify position in the mirror configuration and to respond to the source instance indicating success for a successful configuration and indicating failure for unsuccessful configuration.

15. The data system according to claim 14 further comprising:
a logic executable at the storage sites that causes the source instance to respond to successful configuration of the information instance by queuing entries for the destination instance as a target of an asynchronous mirroring relationship; and
the logic causing the source instance to receive a request, write to local virtual disks according to the request, create a data packet containing at least data to be mirrored, uniquely identify the data packet, send the data packet to the information instance, wait for information instance acknowledgement of successful writing to information instance virtual disks, and queue the data packet local to the source instance.

16. The data system according to claim 15 further comprising:
a logic executable at the storage sites that causes the information instance to receive the data packet from the source instance, write the data packet to the information instance virtual disks, return acknowledgement of data packet successful writing to the source instance, and queue data packets to be sent to the destination instance local to the information instance; and
the logic causing the information instance to send the queued data packets to the destination instance, wait for destination instance acknowledgement of successful writing to destination instance virtual disks, remove data packets from the queue in response to destination instance acknowledgement of writing the data packets, and return acknowledgement of data packet successful writing in the destination instance to the source instance.

17. The data system according to claim 16 further comprising:
a logic executable at the three storage sites that causes the destination instance to receive the data packet from the information instance, write the data packet to the destination instance virtual disks, record identification of the written data packet, and return acknowledgement of data packet successful writing to the information instance.

18. A method for handling data in a storage system comprising:
arranging at least three sites, each site comprising a hard drive, in a mirroring configuration;
managing data storage among the at least three sites in a full mirroring relationship; and creating a virtual connection between instances of a storage group on two of the sites whereby no user data is transmitted on the virtual connection and data on the virtual connection is monitored through a third site.

19. The method according to claim 18 further comprising:
managing data storage in a cascaded mirroring configuration;
sending data synchronously from a site A to a site B and then asynchronously from the site B to a site C;
maintaining the virtual connection from the site A to the site C; and
monitoring data that the site B sends to the site C whereby the site A is enabled to establish a mirror relationship with the site C in event of site B failure.

20. The method according to claim 18 further comprising:
managing data storage in a fan-out mirroring configuration that sends data from a site A to a site B and a site C;
maintaining the virtual connection at the site B;
monitoring at the site B data that the site A sends to the site C; and
establishing at the site B a mirror relationship with the site C in event of site A failure.

21. A non-transitory, computer readable medium, comprising
computable readable program code embodied therein adapted to handle data in a storage system, the computable readable program code further comprising:
a code adapted to cause the controller to arrange at least three sites, each site comprising a hard drive, in a mirroring configuration;
a code adapted to cause the controller to manage data storage among the at least three sites in a full mirroring relationship; and
a code adapted to cause the controller to create a virtual connection between instances of a storage group on two of the sites whereby no user data is transmitted on the virtual connection and data on the virtual connection is monitored through a third site.

* * * * *